US007975142B2

(12) United States Patent
Jeong et al.

(10) Patent No.: US 7,975,142 B2
(45) Date of Patent: Jul. 5, 2011

(54) RING AUTHENTICATION METHOD FOR CONCURRENCY ENVIRONMENT

(75) Inventors: Ik Re Jeong, Gwangju (KR); Do Won Hong, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 871 days.

(21) Appl. No.: 11/932,916

(22) Filed: Oct. 31, 2007

(65) Prior Publication Data

US 2008/0133917 A1      Jun. 5, 2008

(30) Foreign Application Priority Data

Dec. 4, 2006   (KR) .................. 10-2006-0121835
May 17, 2007   (KR) .................. 10-2007-0048106

(51) Int. Cl.
*H04L 9/32* (2006.01)
(52) U.S. Cl. ......................... 713/175; 380/30
(58) Field of Classification Search .............. 380/44–47, 380/30
See application file for complete search history.

(56) References Cited

U.S. PATENT DOCUMENTS

| 4,933,970 | A |  | 6/1990 | Shamir |  |
|---|---|---|---|---|---|
| 6,144,944 | A | * | 11/2000 | Kurtzman et al. | 705/14.54 |
| 6,584,447 | B1 | * | 6/2003 | Fox et al. | 705/10 |
| 6,600,823 | B1 | * | 7/2003 | Hayosh | 380/51 |
| 6,941,471 | B2 | * | 9/2005 | Lin | 726/1 |
| 2004/0030888 | A1 |  | 2/2004 | Roh et al. |  |
| 2007/0189535 | A1 |  | 8/2007 | Lee et al. |  |
| 2008/0077791 | A1 | * | 3/2008 | Lund et al. | 713/156 |
| 2008/0215549 | A1 | * | 9/2008 | Annau et al. | 707/3 |
| 2010/0274783 | A1 | * | 10/2010 | Chevalier et al. | 707/723 |

FOREIGN PATENT DOCUMENTS

| EP | 1681826 A1 | 7/2006 |
|---|---|---|
| JP | 09-298537 | 11/1997 |
| KR | 1020030050620 A | 6/2003 |

OTHER PUBLICATIONS

Moni Naor, "Deniable Ring Authentication", *CRYPTO 2002, LNCS 2442*, pp. 481-498, Springer-Verlag Berlin Heidelberg.
Willy Susilo and Yi Mu, "Non-interactive Deniable Ring Authentication", *ICISC 2003, LNCS 2971*, pp. 386-401, Springer-Verlag Berlin Heidelberg.

* cited by examiner

*Primary Examiner* — Kambiz Zand
*Assistant Examiner* — Dant B Shaifer Harriman

(57) ABSTRACT

A ring authentication method for a concurrency environment, the method capable of providing unforgeability, sender anonymity, and deniability in the concurrency environment, in which, when a receiver receiving a message requests a sender of the message to certify the message, the sender requested to certify the message sends a message certification value certifying that the sender is one of a plurality of users $\{P_1, \ldots, P_n\}$ and authenticates the message m to the receiver, and the receiver verifies the sent message certification value and authenticates that the message is sent from the one of the plurality of users $\{P_1, \ldots, P_n\}$.

8 Claims, 1 Drawing Sheet

RING AUTHENTICATION METHOD FOR CONCURRENCY ENVIRONMENT

CROSS-REFERENCE TO RELATED APPLICATIONS

This application claims the priority of Korean Patent Application No. 10-2006-0121835 filed on Dec. 4, 2006, and the priority of Korean Patent Application No. 2007-0048106 filed on May 17, 2007, in the Korean Intellectual Property Office, the disclosure of which is incorporated herein by reference.

BACKGROUND OF THE INVENTION

1. Field of the Invention

The present invention relates to a ring authentication method for a concurrency environment, the method capable of providing unforgeability, sender anonymity, and deniability in the concurrency environment.

The present invention was supported by the IT R&D program of MIC/IITA. [Project code: 2005-Y-001-02, Project title: Developments of next generation security technology]

2. Description of the Related Art

Message authentication indicates a technology in which, when a sender sends a message to a receiver, the receiver is capable of confirming an identification (ID) of the sender, which should provide unforgeability, sender anonymity, and deniability.

In this case, the unforgeability indicates that an attacker is incapable of disguising as another user, the sender anonymity indicates that receiver is only known that "a sender of a message is one of n number of users." but a actual sender is unknown, and the deniability indicates that the attacker is incapable of certifying that "a sender and a receiver authenticate a message." to another user by using an obtained authentication protocol message.

As a message authentication method, a ring authentication method (CRYPTO 2002, refer to p 481-498) is provided by Moni Naor. The ring authentication method uses that a person who knows a private key corresponding to a public key is capable of correctly extracting a plaintext from a ciphertext. The ring authentication method is formed in such a way that only a person who knows a private key corresponding to at least on public key of several public keys is capable of knowing a correct plaintext.

However, in real life, several sessions may be concurrently performed. The ring authentication method is incapable of providing the deniability when the receiver performs protocols with several senders at the same time.

To provide the deniability in a concurrency environment, a ring authentication method using a ring signature and a chameleon hash function is proposed by Susilio and Mu (ICISC 2003, refer to p386-401). The method proposed by Susilio and Mu uses the ring signature and allows a receiver to know that one user belonging to a certain user set signs. According to the method, a message sender may deny "a message m is authenticated" with respect to a certain message. However, a fact that "a message is authenticated" is incapable of being denied. Accordingly, perfect deniability is not provided.

SUMMARY OF THE INVENTION

An aspect of the present invention provides a ring authentication method for a concurrency environment, the method capable of providing unforgeability, sender anonymity, and perfect deniability in the concurrency environment.

According to an aspect of the present invention, there is provided a ring authentication method for a concurrency environment, the method including: requesting a sender of a message to certify the message, the requesting is performed by a receiver receiving the message; sending a message certification value certifying that the sender is one of a plurality of users $\{P_1, \ldots, P_n\}$ and authenticates the message, from the sender requested to certify the message to the receiver by using a signature of proof of knowledge; and verifying the sent message certification value and checking whether the message is authenticated, the verifying and checking is performed by the receiver.

BRIEF DESCRIPTION OF THE DRAWINGS

The above and other aspects, features and other advantages of the present invention will be more clearly understood from the following detailed description taken in conjunction with the accompanying drawing, in which.

DETAILED DESCRIPTION OF THE PREFERRED EMBODIMENT

Figure 1:
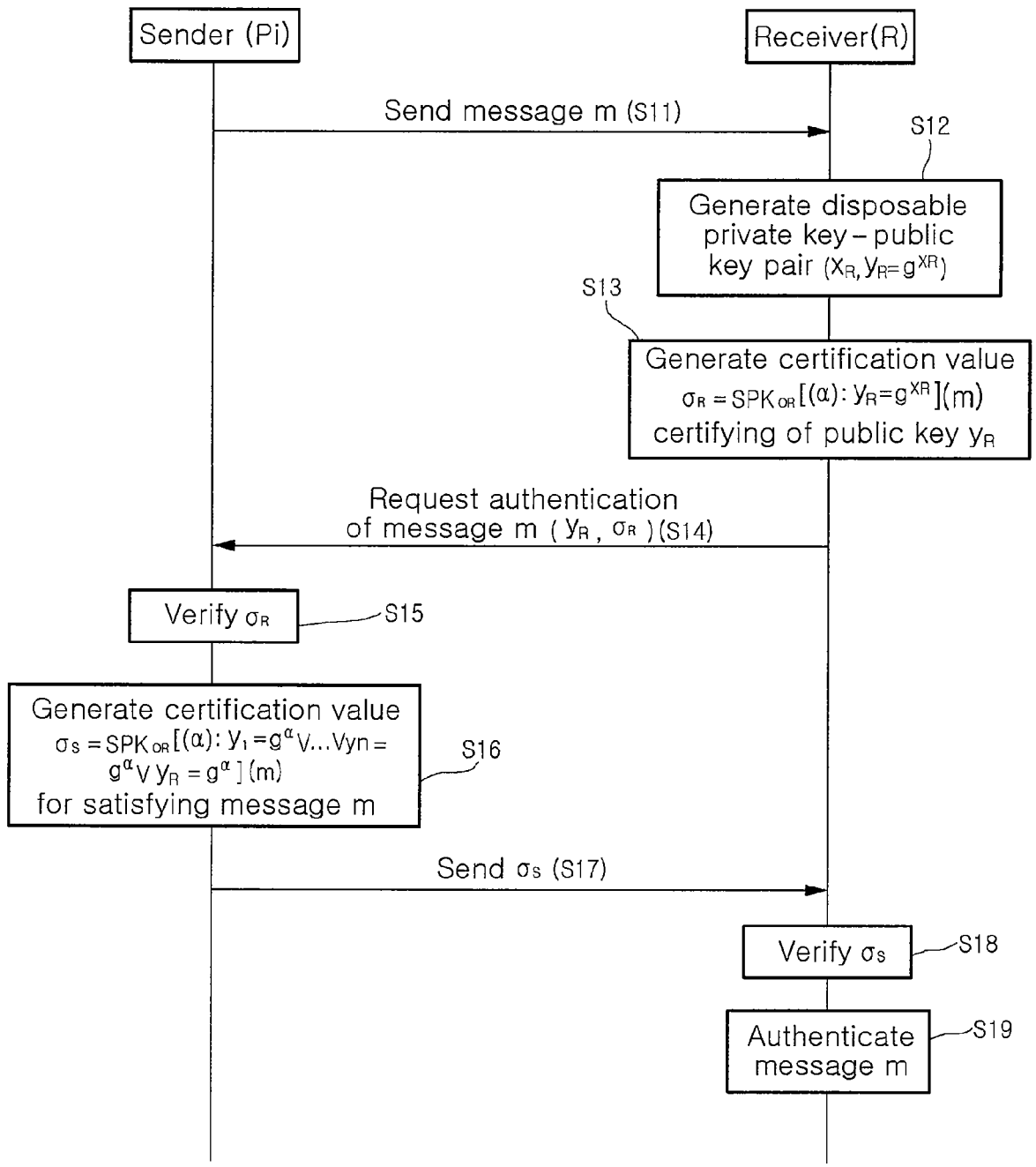
FIG. 1 is a flowchart illustrating a ring authentication method in a concurrency environment according to an embodiment of the present invention.

Exemplary embodiments of the present invention will now be described in detail with reference to the accompanying drawings. Only, in describing operations of the exemplary embodiments in detail, when it is considered that a detailed description on related well-known functions or constitutions unnecessarily may make essential points of the present invention be unclear, the detailed description will be omitted.

In the drawings, the same reference numerals are used throughout to designate the same or similar components.

The present invention may allow a receiver to check that a message m is authenticated by one of users in a predetermined group by using a signature of proof of knowledge, thereby providing sender anonymity simultaneously with perfect deniability.

Hereinafter, to help understanding a ring authentication method according to an exemplary embodiment of the present invention, the signature of proof of knowledge will be described.

Hereinafter, a group generator of a group G whose order is a decimal q is g. A signature of proof of knowledge according to an exemplary embodiment of the present invention is $SPK_{OR}$, which is capable of certifying that a sender knows one or more discrete logarithms of discrete logarithm values $\{\log_g(y_1), \ldots, \log_g(y_n)\}$ when a set of elements of a certain group is $\{y_1, \ldots, y_n\}$.

For example, it is assumed that the sender knows $x_{i*} = \log_g(y_{i*})$.

In the signature of proof of knowledge, the sender sends $\sigma = (c_1, \ldots, c_n, s_1, \ldots, s_n)$ to a receiver calculated by Equation 1.

$$\sigma = (c_1, \ldots, c_n, s_1, \ldots, s_n) = SPK_{OR}[(\alpha): y_1 = g^\alpha \vee \ldots \vee y_n = g^\alpha](m) \quad \text{Equation (1)}$$

To generate $\sigma$, the sender randomly selects $r_i$ and $(c_i, s_i)$ $(1 \leq i(\neq i^*) \leq n)$ and calculates c by using Equation 2.

$$c = H(m\|y_1\| \ldots \|y_n\|y_1^{c_1}g^{s_1}\| \ldots \|g^{r_{i^*}}\| \ldots \|y_n^{c_n}g^{s_n}) \quad \text{Equation (2)}$$

$c_{i*}$ satisfying $$c = \sum_{i=1}^{n} c_i$$

is calculated, and $s_{i*}=r_{i*}-c_{i*}x_{i*}$ is calculated.

On the other hand, the receiver receiving the received σ checks whether the received σ satisfies following Equation 3, thereby certifying that $\sigma=(c_1,\ldots,c_n,s_1,\ldots,s_n)=SPK_{OR}[(\alpha):y_1=g^{\alpha}V\ldots Vy_n=g^{\alpha}](m)$.

$$(c_1+\ldots+c_n) \bmod q = H(m\|y_1\|\ldots\|y_n\|y_1^{c_1}g^{s_1}\|\ldots\|y_n^{c_n}g^{s_n}) \quad \text{Equation (3)}$$

That is, the receiver may certify that the sender knows one or more discrete logarithms $x_{i*}=\log_g(y_{i*})$ of discrete logarithm values $\{\log_g(y_1),\ldots,\log_g(y_n)\}$.

Hereinafter, the ring authentication method using the described signature of proof of knowledge will be described with reference to FIG. 1.

In the ring authentication method according to an exemplary embodiment of the present invention, it is assumed that users $P_i$ sending and receiving a message with another user have a private key/public key pair $(x_i, y_i=g^{x_i})$, respectively.

A sender, via the present invention, certifies that "The sender is one of $\{P_{i_1},\ldots,P_{i_n}\}$ authenticates a message m." to a receiver, thereby providing sender anonymity simultaneously with perfect deniability.

Referring to FIG. 1, a receiver R receives a message m from a sender $P_i$ in S11 and generates a one-time private key/public key pair $(x_R, y_R=g^{x_R})$ to authenticate the message m in S12.

In S13, a receiver certification value $\sigma_R$ certifying that the generated private key/public key pair is known is generated as shown in following Equation 4.

$$\sigma_R = SPK_{OR}[(\alpha):y_R=g^{x_R}](m) \quad \text{Equation (4)}$$

In S14, the generated $(y_R, \sigma_R=SPK_{OR}[(\alpha):y_R=g^{x_R}](m))$ is sent to the sender $P_i$ and requests message certification.

The sender $P_i$ receiving the $(y_R, \sigma_R=SPK_{OR}[(\alpha):y_R=g^{x_R}](m))$ verifies $\sigma_R$ sent from the receiver R and checks the truth of $\sigma_R$ in S15. $\sigma_R$ is verified by using Equation 3 described above.

As a result of the checking, when $\sigma_R$ is correct, the sender $P_i$ generates a message certification value $\sigma_s$ $\sigma_s=(c_1,\ldots,c_n,s_1,\ldots,s_n)=SPK_{OR}[(\alpha):y_1=g^{\alpha}V\ldots Vy_n=g^{\alpha}Vy_R=g^{\alpha}](m)$ for satisfying that one of private key/public key pairs of users is known by using a private key/public key pair $(x_i, y_i=g^{x_i})$ of the sender $P_i$ according to Equation 1 in S16, and sends the generated $\sigma_s$ to the receiver R in S17.

The receiver R verifies the truth of the $\sigma_s$ sent from the sender $P_i$ by using Equation 3 in S18.

As a result of the verifying, when $\sigma_s$ is correct, the receiver R accepts that "The sender $P_i$ is one of $\{P_{i_1},\ldots,P_{i_n}\}$ and authenticates the message m." in S19.

Via this, the receiver R may provide perfect deniability simultaneously with authenticating the message m in a concurrency environment, in which sender anonymity may be provided.

As described above, according to an exemplary embodiment of the present invention, when authenticating a message in a concurrency environment, perfect deniability is provided simultaneously with providing unforgeability and sender anonymity. In addition, the ring authentication method according to an exemplary embodiment of the present invention is capable of being embodied as a two-round, thereby providing efficiency similar to or higher than conventional methods.

While the present invention has been shown and described in connection with the exemplary embodiments, it will be apparent to those skilled in the art that modifications and variations can be made without departing from the spirit and scope of the invention as defined by the appended claims.

What is claimed is:

1. A ring authentication method for a concurrency environment, the method comprising:
   providing a plurality of user devices $\{P_1,\ldots,P_n\}$ including a sender and a receiver, wherein each of the user devices $\{P_1,\ldots,P_n\}$ sends and receives a message with another one of the user devices $\{P_1,\ldots,P_n\}$ to provide sender anonymity;
   sending a message from the sender to the receiver;
   requesting the sender to certify the message, the requesting being performed by the receiver;
   sending a message certification value certifying that the sender is one of the plurality of user devices $\{P_1,\ldots,P_n\}$ and authenticating the message by using a signature of proof of knowledge from the sender to the receiver; and
   verifying the message certification value from the sender and checking whether the message is authenticated, the verifying and checking being performed by the receiver.

2. The method of claim 1, wherein the message certification value certifies that the sender knows one of a plurality of private key/public key pairs when the plurality of user devices have the private key/public key pairs, respectively.

3. The method of claim 2, further comprising:
   generating a disposable private key/public key pair before the requesting of the message certification, the generating being performed by the receiver; and
   generating a receiver certification value certifying that the receiver knows the disposable private key/public key pair by using a signature of proof of knowledge,
   wherein, in the requesting of the message certification, the disposable public key and the receiver certification value are sent together.

4. The method of claim 3, further comprising verifying the receiver certification value, the verifying being performed by the sender, and sending the message certification value to the receiver when the receiver certification value is verified.

5. The method of claim 3, wherein the receiver certification value is $$\sigma_R = SPK_{OR}[(\alpha):y_R=g^{x_R}](m)$$

where $\sigma_R$ is the receiver certification value, m indicates the message received by the receiver, $(x_R, y_R=g^{x_R})$ is the disposable private key/public key pair generated by the receiver, and $SPK_{OR}$ represents the signature of proof of knowledge.

6. The method of claim 5, wherein the message certification value is $\sigma_s=(c_1,\ldots,c_n,s_1,\ldots,s_n)=SPK_{OR}[(\alpha):y_1=g^{\alpha}V\ldots Vy_n=g^{\alpha}Vy_R=g^{\alpha}](m)$
where $\sigma_s$ is the message certification value and m is the message to be certified.

7. The method of claim 6, wherein, in the verifying of the message certification value and checking whether the message is authenticated, when the message certification value is correct, it is accepted that "the sender is one of $\{Pi_1,\ldots,Pi_n\}$ and authenticates the message m."

8. The method of claim 7, wherein the verifying of the message certification value is performed by $(c_1+\ldots+c_n) \bmod q = (m\|y_1\|\ldots\|y_n\|y_1^{c_1}g^{s_1}\|\ldots\|y_n^{c_n}g^{s_n})$.

* * * * *